United States Patent [19]
McQuiggan et al.

[11] Patent Number: 5,829,245
[45] Date of Patent: Nov. 3, 1998

[54] COOLING SYSTEM FOR GAS TURBINE VANE

[75] Inventors: Gerard McQuiggan; Raymond Scott Nordlund, both of Orlando; Leslie Roy Southall, Longwood; William Edward North, Winter Springs; Zachary Sinnott, Winter Park, all of Fla.

[73] Assignee: Westinghouse Electric Corporation, Pittsburgh, Pa.

[21] Appl. No.: 775,434

[22] Filed: Dec. 31, 1996

[51] Int. Cl.⁶ ...................................................... F02C 7/12
[52] U.S. Cl. .......................... 60/39.75; 415/114; 415/115
[58] Field of Search ........................... 60/39.75; 415/114, 415/115, 116, 117

[56] References Cited

U.S. PATENT DOCUMENTS

| | | | |
|---|---|---|---|
| 4,604,780 | 8/1986 | Metcalfe | 415/115 |
| 5,320,483 | 6/1994 | Cunha et al. | 415/114 |
| 5,394,687 | 3/1995 | Chen et al. | |
| 5,464,322 | 11/1995 | Cubha et al. | 415/115 |
| 5,536,143 | 7/1996 | Jacala et al. | |

*Primary Examiner*—Louis J. Casaregola
*Attorney, Agent, or Firm*—D. G. Maire

[57] ABSTRACT

A gas turbine that has turbine vanes that can be cooled with either steam or air includes a compressor that compresses air, a combustor enclosed within a shell and in flow communication with the compressor, a turbine in flow communication with the combustor and receiving hot gas from the combustor and turbine vanes. The turbine vanes having an airfoil, a shroud and a cooling circuit that cools the airfoil and the shrouds with either steam or air.

23 Claims, 9 Drawing Sheets

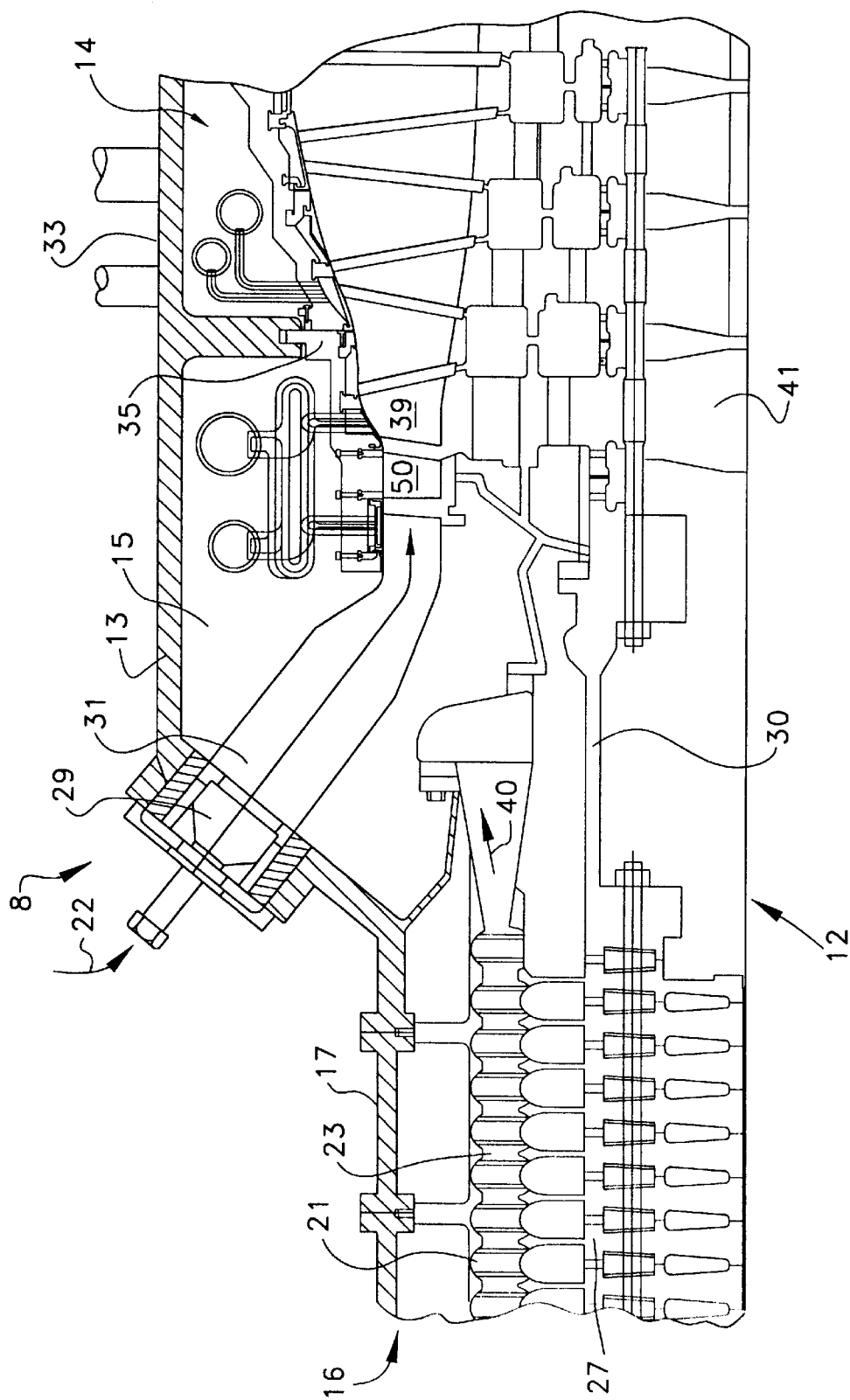
FIG. 1 (AMENDED)

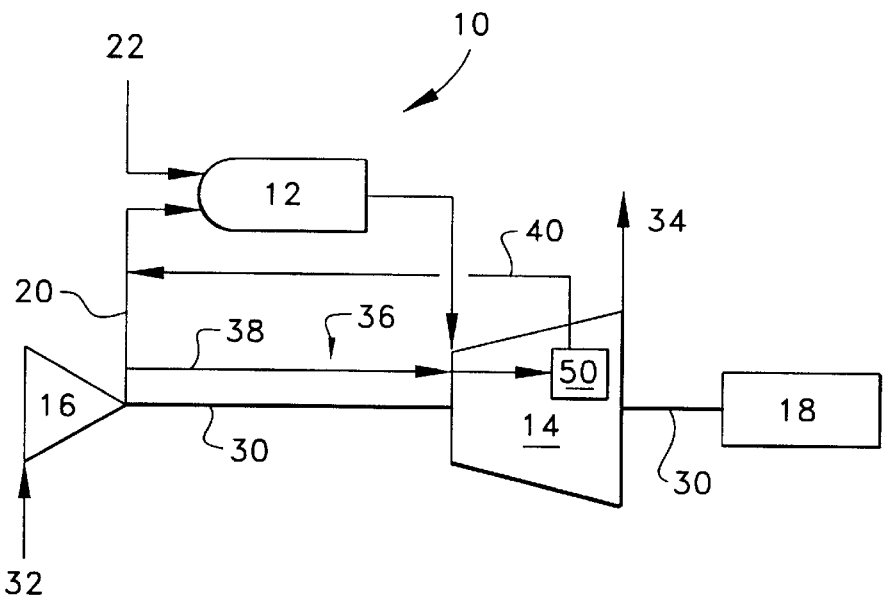
FIG. 2
(AMENDED)

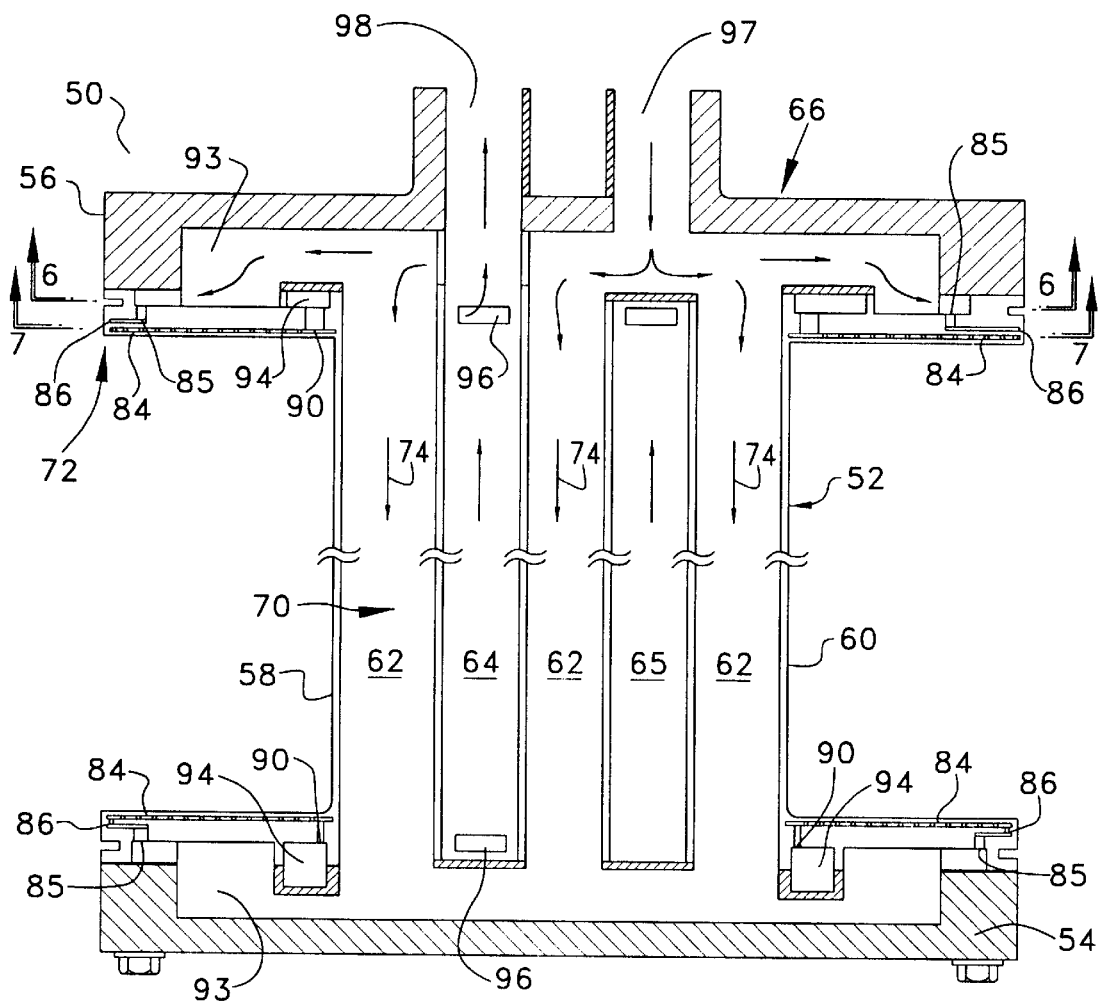
FIG. 4
(AMENDED)

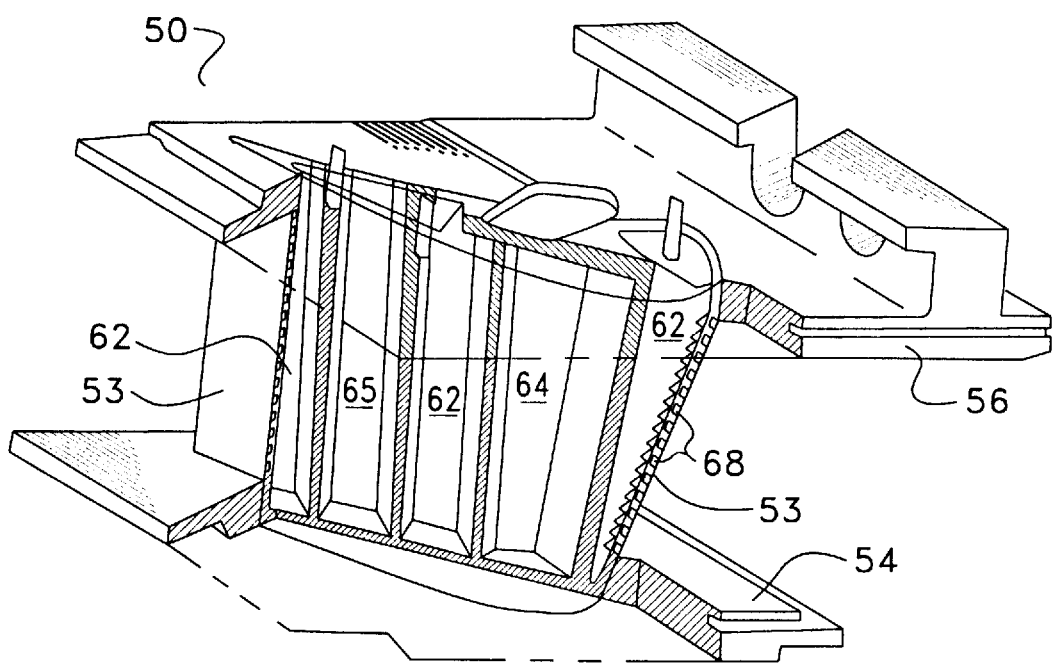
FIG. 9
(AMENDED)

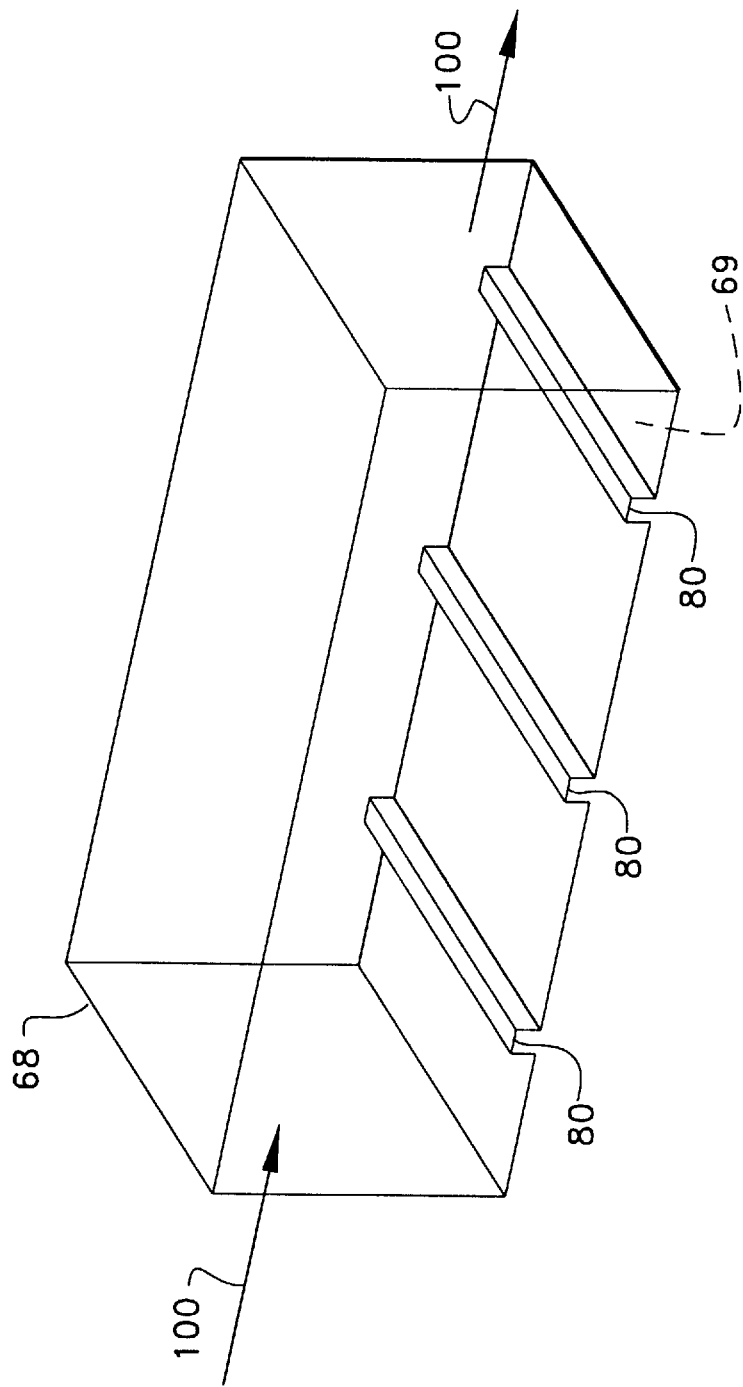
FIG. 10
(AMENDED)

COOLING SYSTEM FOR GAS TURBINE VANE

FIELD OF THE INVENTION

This invention relates to a gas turbine that uses either air or steam to cool a turbine vane and a turbine vane that can be cooled by either air or steam.

BACKGROUND OF THE INVENTION

The U.S. Government has a paid-up license in this invention and the right in limited circumstances to require the patent owner to license others on reasonable terms as provided for by the terms of contract No. DE-FC21-95MC32267 awarded by the Department of Energy.

As will be appreciated by those skilled in the art, a typical gas turbine has a compressor, a combustor and a turbine. In the compressor, air is compressed and then flows to the combustor. While in the combustor, the air is burned with fuel to produce a hot gas. The hot gas flows from the combustor and into the turbine. While flowing through the turbine, the gas expands and causes a rotor shaft to rotate. Rotation of the shaft produces useful work. For example, the shaft may drive an electrical generator to produce electricity.

Contained within the turbine section is a plurality of stationary vanes circumferentially arranged around the rotor. In addition to being arranged circumferentially around the rotor, the turbine vanes are also arranged in a series of rows. Since the hot gas discharged from the combustor flows through these vanes, cooling these vanes is a necessity.

Traditional methods of cooling include both "closed loop" and "open loop" systems. As is known in the art, either air or steam is typically used as a coolant in these systems. Open loop systems employing air typically use air from the compressor and direct it into the interior of the vanes, through apertures in the vanes and over the exterior surface of the vane. After flowing over the exterior surface of the vane, the air mixes with the gas flowing through the turbine and is exhausted from the turbine. Heat transfer typically takes place through a process known as film cooling. Film cooling refers to the cooling process that occurs as coolant flows over the exterior surface of a turbine vane and thereby forms a cooling film over the surface.

In closed loop systems of the type disclosed in U.S. Pat. No. 5,394,687, air is also taken from the outlet of the compressor and sent through the vanes. However, in a closed loop system the heated air does not flow through apertures in the vane and is not exhausted. Rather, it flows through an inner region of the vane and is directed back into the system so that the energy in the air can be utilized. For example, after flowing through the vane the air may be directed to the outlet of the compressor and sent into the combustor or back through the vane cooling system. In most applications, closed loop systems are preferable because they are more thermodynamically efficient. More specifically, the mixing of the coolant with the hot gas in open loop systems results in aerodynamic losses. Moreover, the energy contained in the exhausted air in open loop systems is not recovered, but in closed loop systems this energy is recovered as the air is recycled.

A system employing steam as a coolant is described in U.S. Pat. No. 5,536,143. In systems employing steam as the cooling medium, the steam is typically produced by heat contained in the turbine exhaust gas. Using steam as the cooling medium, rather than air, is advantageous because steam systems are generally much more thermodynamically efficient than air systems. For instance, since cooling air is not being extracted from the compressor in a steam cooling system, the air (that would be used as cooling air in an air system) is sent through the combustor to do work. As will be appreciated by those skilled in the art, this is more efficient because the energy in the air is used for combustion and is not extracted while being used as a coolant.

Although steam has the significant advantage of having a higher heat capacity, it has disadvantages as well. Specifically, since steam is produced by the turbine exhaust gas, the steam is not initially available to cool the turbine components upon starting the turbine. As the turbine is being started, the hot gas is produced and the steam is then produced from the hot gas. Once sufficient steam is produced to cool the turbine components, such as the vanes, the turbine can then be fully started and placed in operation. As is evident from the description of this procedure, there is a delay in starting the turbine until sufficient steam is produced. This delay is inefficient and results in lost operating time. In contrast, systems using air as the cooling medium can be started relatively rapidly because compressed air is readily available. However, as mentioned above air cooling systems have the disadvantage of having a significantly lower heat capacity than steam systems.

As described above, turbine vanes are cooled by either steam or air. Since steam and air have different specific heat capacities, in order to achieve the requisite heat transfer rate vanes employing steam as a coolant are designed differently than vanes employing air as a coolant. More particularly, because of the different heat capacities, different flow rates of steam and air are required in order to achieve the same amount of cooling. Different flow rates are achieved by designing the vanes with different coolant flow paths based on the cooling medium used. This is illustrated by comparing the vanes using air as a coolant disclosed in U.S. Pat. No. 5,394,687 with vanes using steam as a coolant as described in U.S. Pat. No. 5,536,143.

If a vane could be designed that can utilize either air or steam as a coolant, then air could be provided to cool the vane during turbine startup until sufficient steam is produced to cool the vane. This would eliminate the delay associated with producing cooling steam during turbine startup.

Since vanes using air and vanes employing steam have different designs, they are not interchangeable. Consequently, those owning both steam and air cooled vanes must have a supply of both types of vanes. This significantly increases inventory costs.

It is obvious there has existed a long and unfulfilled need for (1) a gas turbine cooling system that employs steam, but is also capable of employing air at least until sufficient steam is available for cooling, and (2) a turbine vane that can be cooled by either steam or air.

SUMMARY OF THE INVENTION

Accordingly, it is an object of this invention, to provide for a cooling system for a gas turbine that has the high heat capacity of steam but can also employ air as a coolant until the steam is produced. It is a further object of this invention to provide for a turbine vane that can be cooled by either steam or air. Another object of this invention is provide for a turbine vane that is interchangeable with a steam cooling system and an air cooling system.

In order to achieve these and other objects of this invention, a gas turbine vane has an airfoil and a cooling circuit that cools the airfoil. The cooling circuit is capable of employing either steam or air as the coolant.

According to another aspect of this invention, a gas turbine vane has a shroud disposed at an end of the airfoil and a cooling circuit that cools the airfoil and the shroud with either steam or air as the coolant.

According to a third aspect of this invention, the invention also includes, a compressor for compressing air, a combustor enclosed within a shell and in flow communication with the compressor and producing a hot gas and a turbine in flow communication with the combustor. Disposed within the turbine is a vane having an airfoil, a shroud and a cooling circuit. The cooling circuit has an inlet plenum running radially through the airfoil, an outlet plenum running radially through the airfoil and a plurality of cooling channels running from the inlet plenum and to the outlet plenum, so that a coolant can flow from the inlet plenum, through the cooling channels and to the outlet plenum.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a partial cross section of a portion of a gas turbine according to a preferred embodiment of the invention;

FIG. 2 is a schematic diagram of a simple-cycle gas turbine employing air as a vane coolant;

FIG. 4 is a diagrammatical view of one of the turbine vanes shown in FIG. 1;

FIG. 9 is an isometric view of the turbine vane depicted in FIG. 4; and

FIG. 10 is an isometric view of a vane cooling channel.

DETAILED DESCRIPTION OF THE PREFERRED EMBODIMENTS

Figure 3:
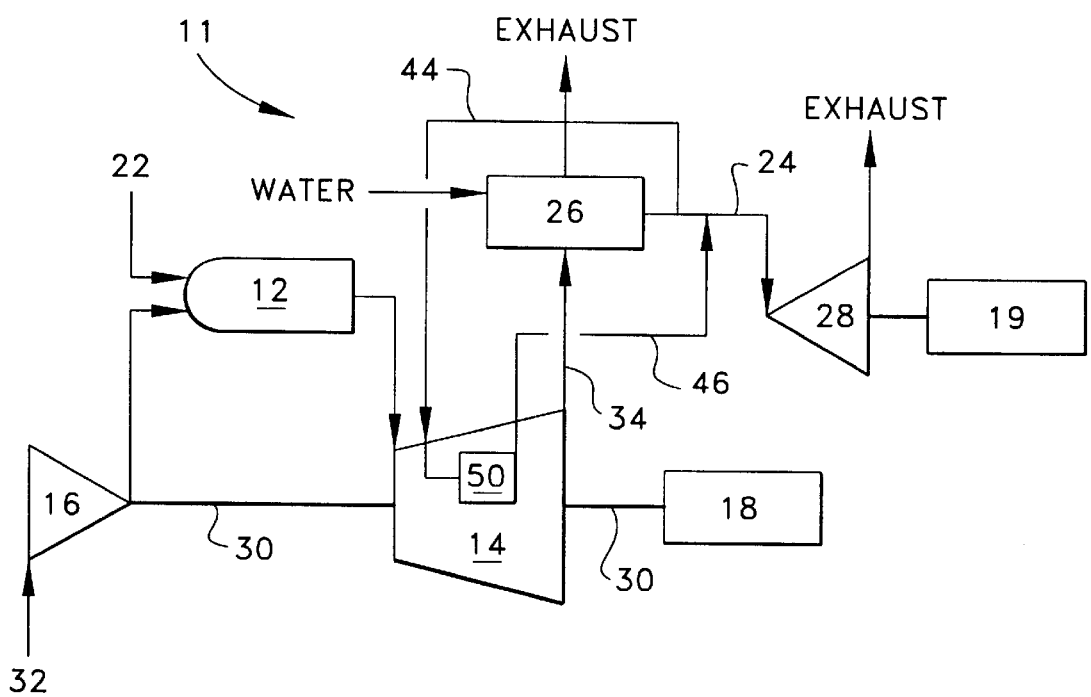
FIG. 3 is a schematic diagram of a combined cycle gas turbine employing steam as a vane coolant.

Referring now to the drawings, wherein like reference numerals designate corresponding structure throughout the views, and referring in particular to FIG. 1, a gas turbine 8 generally includes a compressor section, a turbine section, and a combustor section, herein referred to as a compressor 16, a turbine 14 and a combustor 12. As will be appreciated by those skilled in the art, a turbine 8 is typically referred to as either a simple cycle turbine or a combined cycle turbine. Consequently, the operation of the compressor 16, the combustor 12 and the turbine 14 will be discussed in conjunction with a description of each cycle. In FIG. 2, a schematic diagram of a simple cycle gas turbine 10 is illustrated. Air enters the inlet of the compressor at 32 and is compressed as it travels through the compressor 16. After traveling through the compressor 16, the air 20 enters the combustor 12 where fuel, such as natural gas, is burned. Hot gas exits the combustor 12 and travel through the turbine 14. In the turbine 14 the gas expands, and the energy of the hot gas is converted into work to drive the rotor shaft 30. More specifically, as the rotor shaft 30 turns it may drive the compressor 16 and another load 18. This load 18 is typically an electrical generator. Hot gas is then exhausted from the turbine 14 at 34.

In contrast to the simple cycle gas turbine 10 illustrated in FIG. 2, FIG. 3 depicts a combined cycle gas turbine 11. The turbine 14, the compressor 16 and the combustor 12 of the combined cycle gas turbine 11 operate similarly to those in a simple cycle gas turbine 10. However, in a combined cycle gas turbine 11 the energy in the turbine exhaust gas 34 is converted into useful work. For example, as shown in FIG. 3, the exhaust gas 34 may be directed to a heat recovery steam generator (HRSG) 26 to convert water into steam 24. The steam 24 is then used to drive a steam turbine 28 which drives another load 19, such as an electrical generator. Alternatively, the steam 24 may drive the load 18 driven by the turbine 14. Because the heat of the turbine exhaust gas 34 is used to produce additional work, combined cycle turbines 11 are generally much more efficient than simple cycle turbines 10.

The compressor 16, the combustor 12 and the turbine 14 are depicted in greater detail in FIG. 1. As illustrated in FIG. 1 and is known in the art, the compressor includes a cylinder 17 that encloses alternating rows of stationary vanes 21 and rotating vanes 23. The stationary vanes 21 are attached to an inner portion of the cylinder 17, and the rotating vanes 23 are connected to disks 27 that form a portion of the rotor 30. The rotor 30 extends from the compressor and into the turbine 14.

As is also depicted in FIG. 1, the combustor 12 includes a shell 13 that forms a chamber 15. Contained within the chamber 15 is a plurality of combustors 12 and ducts 31. Although only one combustor 29 and one duct 31 is shown, a plurality of similar combustors 29 and ducts 31 are arranged within the shell 13. The ducts 31 connect the combustors 29 to the turbine 14.

Included within the turbine 14 is an outer cylinder 33 that encloses an inner cylinder 35. Enclosed within the inner cylinder 35 are a row of stationary vanes 50 and a row of rotating vanes 39. The stationary vanes 50 are affixed to the inner cylinder 35 while each rotating vane 39 is affixed to a disc 41 that forms a section of the rotor 30. Additionally, although not necessarily, the compressor 16 and the turbine 14 are mounted on a common rotor 30.

In further detail, the operation of a gas turbine 8 includes compressing air as it flows through the compressor 16. More specifically, as the rotor 30 turns, the rotating vanes 23 of the compressor pressurize the air while the stationary vanes 21 direct the flow of the air. After traveling through the compressor 16, the air outlets at 40 and enters the combustor chamber 15. From the chamber 15, the air flows into the combustor 12 where it burns with fuel 22. The hot gas produced in the combustor 12, then flows through the duct 31 to the turbine 14. In the turbine 14, the hot gas expands and drives the turbine rotating vanes 39. These rotating vanes 39 cause the attached rotor shaft 30 to rotate. In the turbine 14, the stationary vanes 50 direct the flow of the hot gas. After flowing through the turbine 14, the hot gas is either exhausted or sent to produce additional work as described above.

Also depicted in FIG. 2, and as disclosed in U.S. Pat. No. 5,394,687, is a schematic diagram of a closed loop air cooling system 36 for cooling turbine vanes 50. In a closed loop system 36, cooling air 38 from the outlet of the compressor 16 is sent through the turbine vanes 50 to cool them. After flowing through the vanes 50, the heated coolant 40 is returned to the outlet of the compressor 16. From the outlet of the compressor 16, the cooling air is then sent either back through the vanes 50 or to the combustor 12. Since the cooling air is not exhausted from the turbine 14 without first passing through the combustor 12, a closed loop system is considered thermodynamically efficient. In contrast, in an open loop system the cooling air does not return to the combustor 12. Instead it passes through apertures in the vanes 50 and is exhausted at 34.

A closed loop steam cooling system for turbine blades is pictured schematically in FIG. 3. In a steam cooling system, steam 44 is taken from the outlet of the HRSG 26 and sent through the turbine vanes 50 to cool them. After traveling through the vanes 50, the steam 46 is returned so that additional work can be extracted from the steam.

As described above, because the specific heat capacity of steam and air is significantly different, vanes 50 designed to be cooled with steam cannot use air as a coolant. Typically, vanes 50 designed to use air as a coolant do not employ steam.

In a preferred embodiment of this invention, the cooling of the turbine vanes 50 is accomplished by recirculating either air or steam through the interior of the vanes 50. If steam is used as the coolant, the flow path is similar to that employed in a typical steam cooling system as described above. Similarly, if air is used as the coolant, the flow path is similar to that as described above.

As can be seen in FIGS. 4 and 9, according to a preferred embodiment of this invention, a vane 50 includes an airfoil 52 arranged between an inner shroud 54 and an outer shroud 56. With respect to the rotor 30, the inner shroud 54 is disposed at a radial inward end of the vane 50, and the outer shroud 56 is situated at a radial outward end of the vane 50. Although a single vane 50 is shown, it will be appreciated that a turbine 14 has a plurality of similar vanes. Preferably, the vane 50 including the shrouds 54,56 and the airfoil 52 is constructed of a single crystal nickel alloy. Typically, the vane 50 is manufactured through a casting process.

Upon inspection of FIG. 4 it will be seen that the airfoil 52 has a leading edge 58 and a trailing edge 60. Additionally, disposed within the vane 50 and the shrouds 54,56 is a cooling circuit 66 that can employ either steam or air as the coolant. In the preferred embodiment depicted in FIG. 4, the cooling circuit 66 has two distinct cooling circuits, an airfoil cooling circuit 70 and a shroud cooling circuit 72. Alternatively, the cooling circuit could employ a single circuit through the airfoil 52 and the shrouds 54,56.

Figure 5:
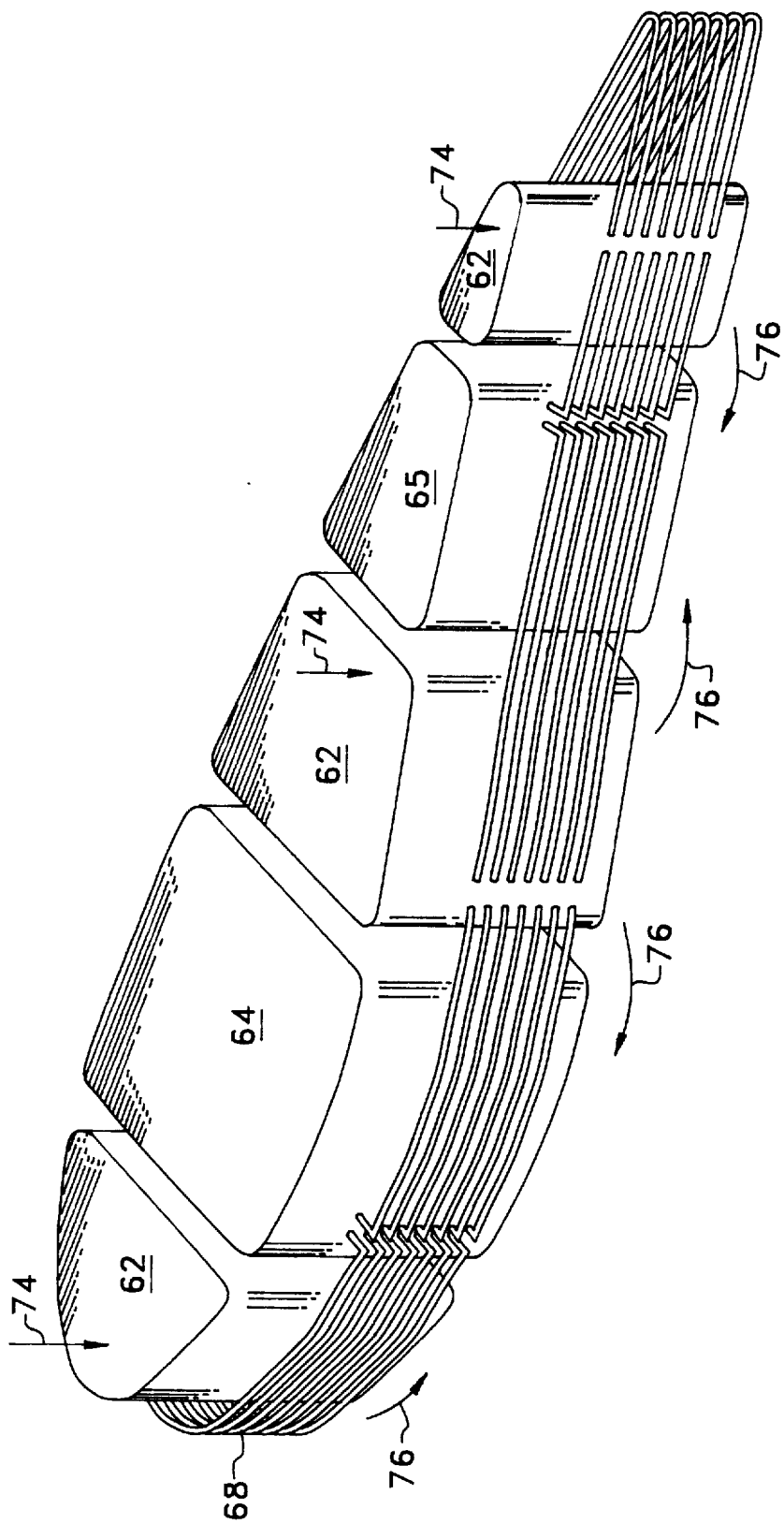
FIG. 5 is a negative image of a portion of the vane depicted in FIG. 4.

Preferably, the airfoil cooling circuit 70 has three inlet plenums 62, two outlet plenums 64,65 and cooling channels 68 arranged within the airfoil 52. Depicted in FIG. 5 is a negative image of a portion of the airfoil 52. Shown in this image are the inlet plenums 62, the outlet plenums 64,65 and the negative image of the cooling channels 68. Another view of the plenums 62,64,65 and the cooling channels 68 is shown in the isometric view depicted in FIG. 9. FIG. 10 is an isometric view of one of the cooling channels 68. It should be noted that the airfoil cooling circuit 70 could have various combinations of inlet plenums 62 and outlet plenums 65. For example, although not shown, the circuit 70 could have two inlet plenums 62 and one outlet plenum 65. As indicated in FIGS. 5, the cooling channels 68 are connected to one of the inlet plenums 62 at one end and one of the outlet plenums 64,65 at another end. The cooling channels 68 are preferably densely spaced and oriented circumferentially around the periphery of the airfoil 52 within an outside wall 53 of the airfoil between the inner shroud 54 and the outer shroud 56, as illustrated with reference again to FIG. 9. By densely spacing the channels 68 within the outside wall 53, much of the cooling of the airfoil 52 occurs in this region.

In operation, the coolant flows down through the inlet plenums 62, as indicated by arrow 74, through the coolant channels 68, as shown by arrow 76, and to the outlet plenums 64,65. As the coolant traverses this path, heat is transferred from the vane 50 to the coolant.

As illustrated in FIG. 4, the airfoil cooling circuit 70 further includes a coolant supply line 97, a coolant return line 98, a supply manifold 93, an exhaust manifold 94 and airfoil slots 96. In the preferred embodiment, a supply manifold 93 is arranged in the outer radial portion of the outer shroud 56 and connects the supply line 97 to the inlet plenums 62. In operation, coolant is supplied to the inlet plenums 62 by flowing from the supply line 97 into the supply manifold 93. The supply manifold 93 directs the coolant to the inlet plenums 62.

Figure 6:
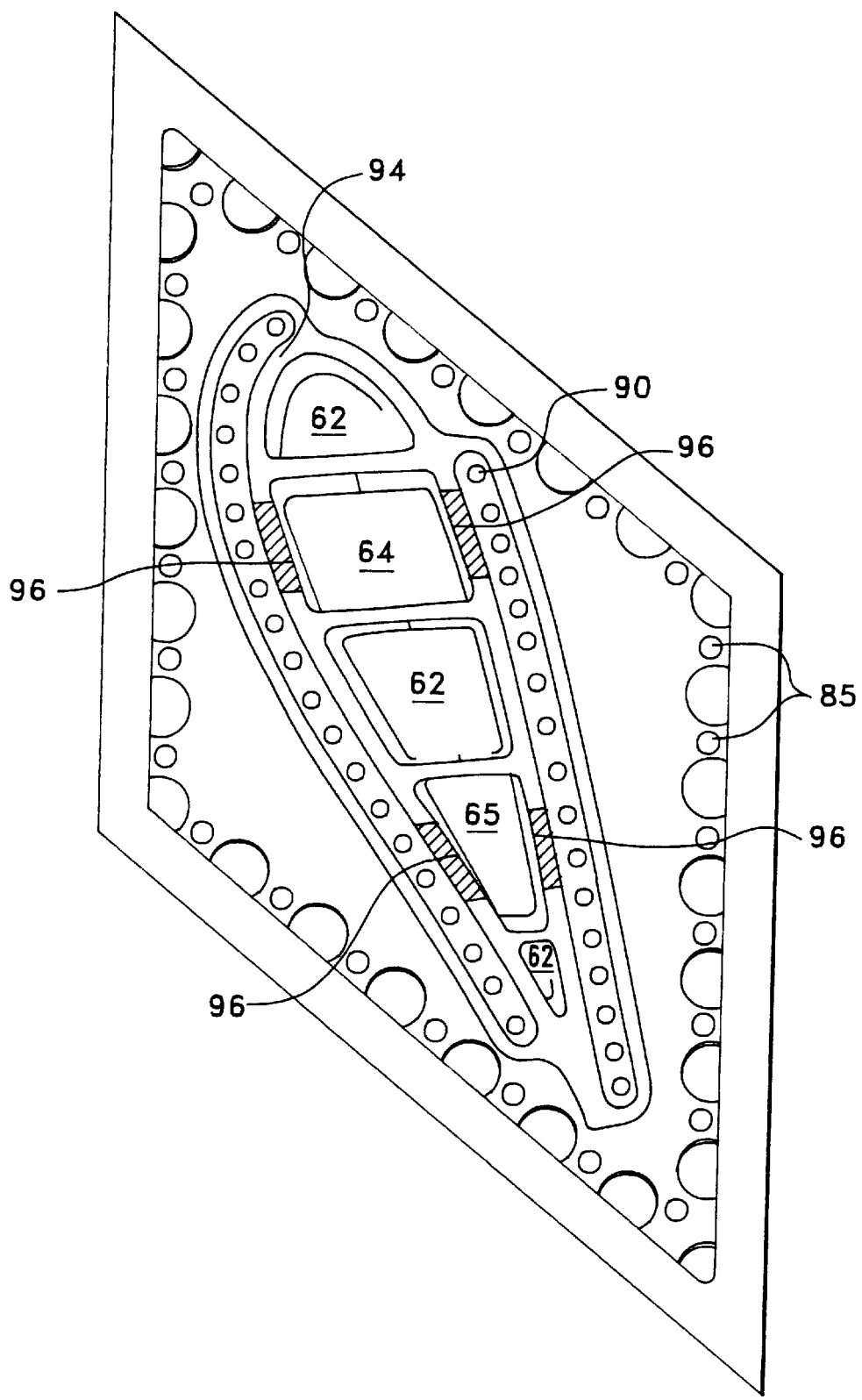
FIG. 6 is a cross section taken through line 6—6 of FIG. 4.

Each shroud 54,56 has an exhaust manifold 94 that operates in conjunction with the airfoil slots 96 to direct coolant out of the vane 50 after traveling through the cooling channels 68. Specifically, as illustrated in FIG. 4, at each radial end of the outlet plenum 64 an airfoil slot 96 is contained on either side of the outlet plenum 64 that is transverse to the leading and trailing edges 58,60. Additionally, outlet plenum 65 has airfoil slots 96 at the outer radial end oriented transverse to the leading and trailing edges 58,60. The slots 96 in the outer radial end of the outlet plenums 64,65 are also shown in FIG. 6. As depicted in FIG. 4, the airfoil slots 96 at the outer radial end in both outlet plenums 64,65 are in flow communication with the exhaust manifold 94 in the outer shroud 56, and the airfoil slots 96 at the radial inward end of the outlet plenum 64 are in flow communication with the exhaust manifold 94 at the radial inward end.

As shown in FIG. 4, one of the outlet plenums 64 is connected to a cooling return line 98. As discussed above, in operation, the coolant flows through the channels 68 and into the outlet plenums 64, 65. Coolant in the outlet plenum 65 then flows through its slots 96 and into the exhaust manifold 94 in the outer shroud 56 as illustrated in FIGS. 4 and 6. From the exhaust manifold 94, the coolant then flows into the slots 96 in the outlet plenum 64 and merges with the coolant in this outlet plenum 64. Finally, the coolant flows to the coolant return line 98 and traverses the closed loop pattern as described above in a typical closed loop cooling system.

In the preferred embodiment, the airfoil cooling circuit 70 may be described as having single-pass flow. More specifically, the coolant passes through the channels 68 a single time while passing through the vane 50.

As depicted in FIG. 10, a coolant channel 68 preferably has flow turbulators 80. Although only one channel 68 is illustrated, it will be appreciated that the other cooling channels are similar. As shown in FIG. 10, the flow turbulators 80 are arranged on an outer side 69 of the channels 68 closest to the turbine gas. In this embodiment, the turbulators 80 are raised sections of the channels 68 and they run across the channels 68 transverse to the direction of flow as indicated with arrow 100. In operation, as coolant flows over the turbulators 80 the flow path of the coolant is changed.

This aids in creating turbulent flow through the airfoil cooling circuit 70, which creates a higher heat transfer rate. Additionally, in this embodiment, the length, the cross-sectional geometry and the radial pitch of each coolant channel 68 can be varied to achieve an optimum heat transfer rate.

As mentioned above, the cooling circuit 66 preferably has a shroud cooling circuit 72. Both the inner shroud 54 and the outer shroud 56 have a shroud cooling circuit 72. Depicted in FIGS. 4, 5–8 are the components of the shroud cooling circuit 72. These components include impingement holes 86 arranged around the periphery 88 of the shrouds 54,56, pedestal banks 84 arranged between the periphery 88 of the shrouds 54, 56 and the airfoil 52, and exhaust holes 90 arranged circumferentially around the airfoil 52. The impingement holes 86 are so named because the coolant strikes the holes 86 and changes direction from transverse to the radial axis of the airfoil 52 to a direction along the axis of the airfoil 52 and then transverse to the radial axis of the airfoil 52 again in the opposite direction. Impinging the coolant aids in creating turbulent coolant flow which increases its heat transfer characteristics.

In operation, coolant flows into the impingement holes 86, inward through the pedestal banks 84, and then out the exhaust holes 90. As the coolant travels through these components, heat is transferred from the shrouds 54, 56 to the coolant. Much of the cooling occurs as the coolant flows through the pedestal bank 84. The geometry of the pedestal bank 84 can be varied to maximize the efficiency and the effectiveness of the shroud cooling circuit 72. For example, varying either the density, the diameter or the height of the pedestal bank 84 can alter the heat transfer rate and the efficiency of the cooling circuit 72.

As shown in FIG. 4, the outer shroud 56 and the inner shroud 54 may have an exhaust manifold 94. The exhaust manifold 94 of the outer shroud 56 is shown in FIG. 6. The exhaust manifold 94 in the inner shroud 54 is similar to that in the outer shroud 56 except it is not in flow communication with the outlet plenum 65 because the outlet plenum 65 does not have airfoil slots at this end. Upon traveling through the exhaust holes 90 in the respective shrouds 54,56, the coolant then flows into the respective manifold 94. In the manifold 94 in the outer shroud 56, the shroud coolant merges with the coolant that flowed through outlet plenum 65 and into the manifold 94. From the manifold 94, the coolant flows through airfoil slots 96, located in the outlet plenum 64 of the airfoil 52, and into the outlet plenum 64. From here, the heated coolant flows through the coolant return line 98 and through a typical closed loop system, as described above.

Figure 8:
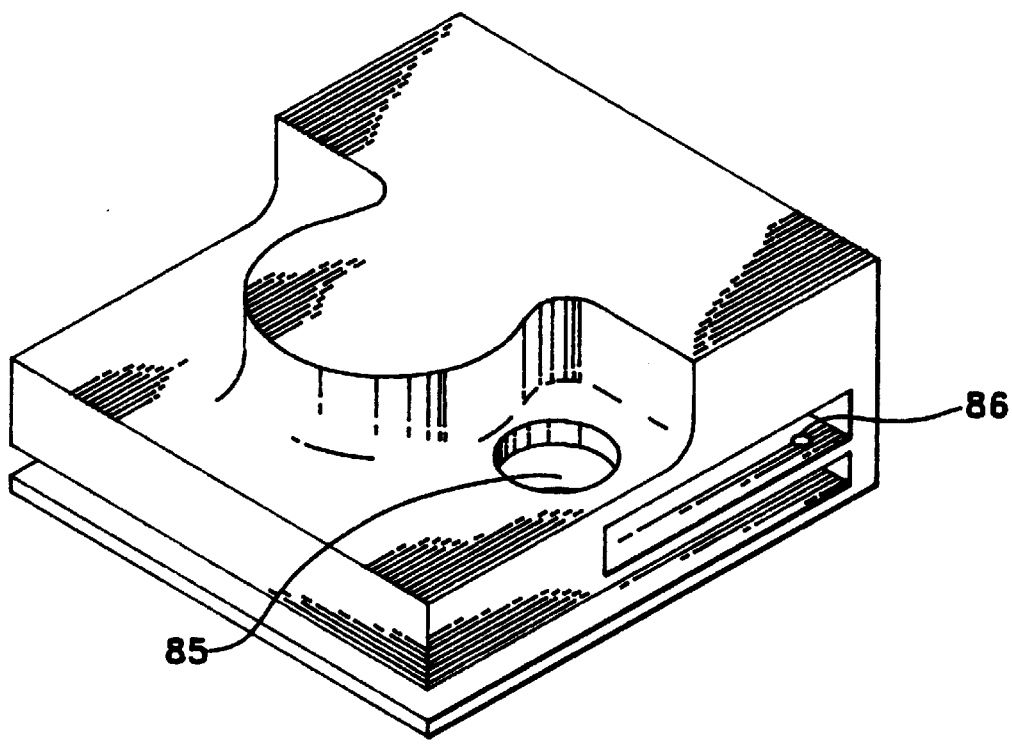
FIG. 8 is an isometric view of a portion of the vane shown in FIG. 4.

With reference to FIG. 4 and 6, the shroud cooling circuit 72 may also include a coolant supply line 97 and within each shroud supply holes 85 and a supply manifold 93. In this embodiment, coolant flows from the coolant supply line 97, into the supply manifold 93 in the outer shroud 56, and through the supply holes 85 of the outer shroud 56. As depicted in FIG. 4, the coolant then flows from the supply holes 85 to the impingement holes 86. FIG. 8 is an isometric view showing the relationship of these supply holes 85 to the impingement holes 86.

The entry path for coolant into the supply holes 85 in the inner shroud 54 is slightly different in the most preferred embodiment. Coolant also enters the inner shroud 54 from the coolant supply line 97. However, before entering the supply holes 85 of the inner shroud 54, the coolant first flows from the supply line 97 down through the inlet plenums 62 of the airfoil 52 and then into the supply manifold 93 of the inner shroud 54 and into its supply holes 85.

Figure 7:
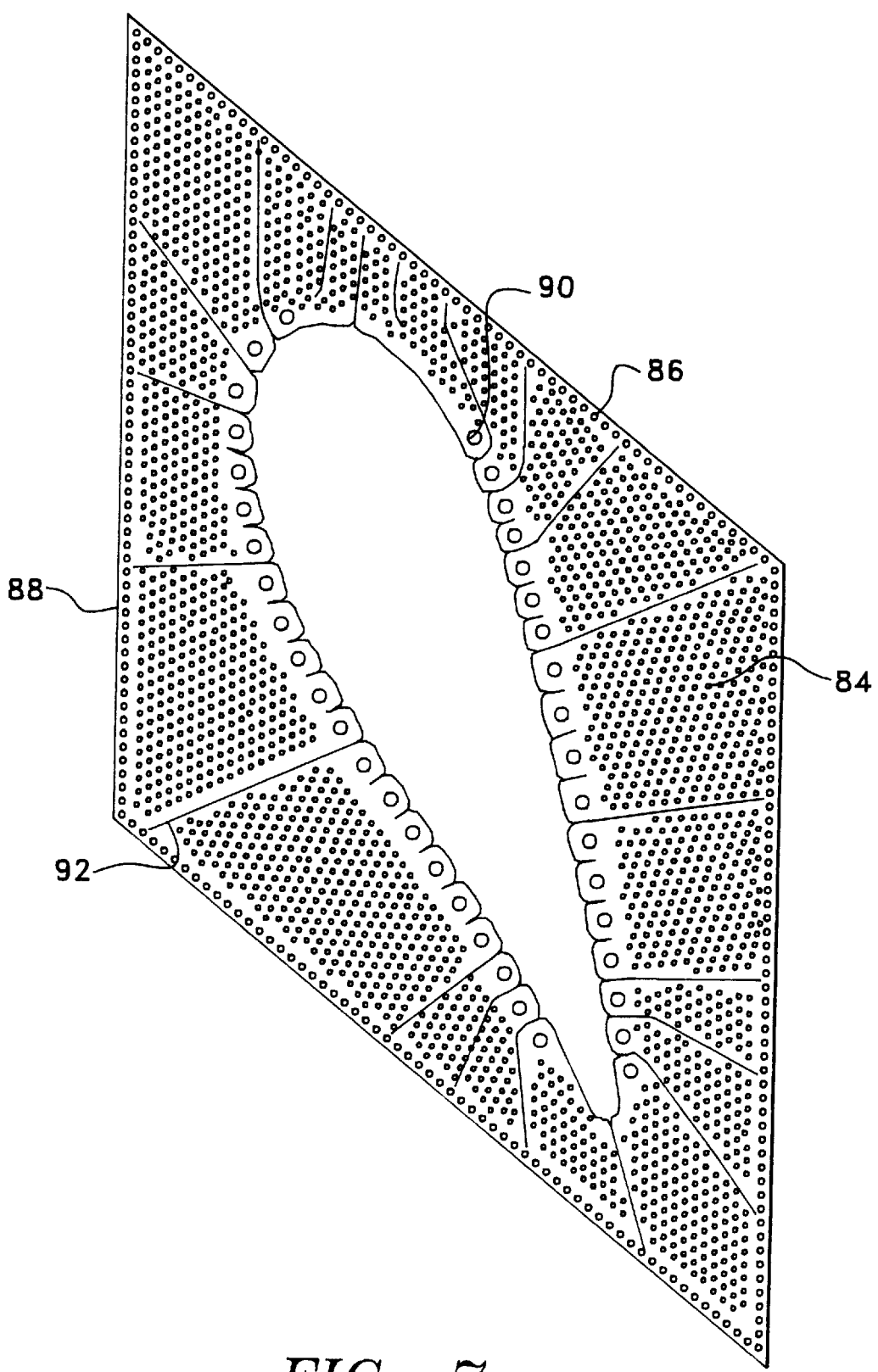
FIG. 7 is a cross section taken through line 7—7 of FIG. 4.

As shown in FIG. 7, the shroud coolant circuits 72 may also have flow guides 92. The flow guides 92, which in this embodiment are "ribs," function to direct flow through the pedestal banks 84 and ensure a proper flow and cooling distribution.

In order to achieve proper cooling of the vane 50, a requisite heat transfer rate to the coolant must be achieved. Since the heat capacities of steam and air are much different, prior art vanes were designed with different flow paths for air and steam to achieve the requisite cooling. These vanes are not interchangeable. A vane that was air cooled could not be cooled by steam, and a vane that was steam cooled could not be cooled by air. However, in the disclosed invention, air and steam can traverse the same flow path in the same vane and achieve the requisite cooling. The vane accomplishes this by designing the coolant circuit 66 so that the velocity of air and the velocity of steam through the circuit 70 will vary to provide the requisite cooling. Specifically, since air has a lower heat capacity, it must travel at a higher velocity through the circuit to achieve the same heat transfer rate as steam. This is accomplished by optimally configuring the size of each of the impingement holes 86, the exhaust holes 90 and the parameters of each of the coolant channels 68. Each coolant channel 68 can be designed so that its diameter at its inlet and outlet, its pitch and its length are the proper size to accommodate both steam and air. Thus, by designing the size of the flow paths, the velocity of the cooling medium, whether it be steam or air, is adequate to achieve the proper heat transfer rate and the requisite cooling.

In the preferred embodiment of this invention, the coolant flow paths are closed loop paths. No film cooling is used. (Film cooling is the process by which the coolant flows over the surface of the vane and protects it from the hot gas; such a method of cooling is often employed in open loop systems). Additionally, in its most preferred embodiment the vane 50 is employed with a combined cycle turbine 11. However, it can also be used in a simple cycle turbine 10.

Since the vane 50 can employ either air or steam as a coolant, the vane 50 provides a standard part that is interchangeable with either type of cooling system. Therefore, those having both types of turbines, turbines that are air cooled and turbines that are steam cooled, need only have an inventory of one type of vane 50. This significantly reduces their inventory costs. Additionally, since the vane 50 can employ either steam or air, air can be provided to a steam cooled turbine during turbine startup prior to steam being generated. This eliminates the delay involved with turbine startup associated with generating sufficient steam to cool the vanes 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A gas turbine comprising:
   a compressor that compresses air;
   a combustor enclosed within a shell and in flow communication with the compressor and producing a hot gas;
   a turbine section in flow communication with the combustor, the turbine section having a rotor extending therethrough; and a vane disposed within the turbine section and comprising an airfoil, and an airfoil cooling circuit having inlet and outlet plenums running radially outward from the rotor within and through the airfoil, and a plurality of cooling channels in flow communication with the inlet plenum and to the outlet plenum, the plurality of cooling channels spaced within an outside wall of the airfoil and proximate the hot gas, the airfoil cooling circuit providing a flow path for coolant to flow from the inlet plenum, through the plurality of cooling channels and to the outlet plenum.

2. The gas turbine as described in claim 1, the cooling circuit further comprising flow turbulators in the cooling channels for imparting turbulence to the coolant flowing through the cooling channels.

3. The gas turbine as described in claim 1, wherein the coolant comprises steam.

4. The gas turbine as described in claim 1, wherein the coolant comprises air.

5. The gas turbine as described in claim 1, further comprising an outer shroud radially disposed from the rotor at an outer radial end of the airfoil, the outer shroud including an impingement hole, an exhaust hole and a pedestal bank situated between the impingement hole and the exhaust hole, such that the flow path for the coolant runs through the impingement hole, through the pedestal bank and through the exhaust hole.

6. The gas turbine as described in claim 5, further comprising a manifold in the outer shroud running around at least a portion of a periphery of the outer radial end of the airfoil and in flow communication with the exhaust hole and the outlet plenum, such that the flow path for the coolant further runs from the exhaust hole through the manifold and into the outlet plenum.

7. The gas turbine as described in claim 5, the outer shroud further comprising a flow guide disposed between the impingement hole and the exhaust hole for directing coolant flow from the impingement hole to the exhaust hole.

8. The gas turbine as described in claim 1, further comprising an inner shroud radially disposed from the rotor at a radial inward end of the airfoil.

9. The gas turbine as described in claim 8, wherein the inner shroud further comprises an impingement hole, an exhaust hole and a pedestal bank situated between the impingement hole and the exhaust hole, such that the flow path for the coolant runs through the impingement hole, through the pedestal bank and through the exhaust hole.

10. The gas turbine as described in claim 9, further comprising a manifold in the inner shroud running around at least a portion of a periphery of the inner radial end of the airfoil and in flow communication with the exhaust hole of the inner shroud and the outlet plenum, such that the flow path for the coolant further runs from the exhaust hole through the manifold and into the outlet plenum.

11. A gas turbine comprising:
a compressor that compresses air;
a combustor enclosed within a shell and in flow communication with the compressor and producing a hot gas;
a turbine section in flow communication with the combustor, the turbine section having a rotor extending therethrough; and
a vane disposed within the turbine section and comprising an airfoil, an outer shroud radially disposed from the rotor at an outer radial end of the airfoil, an inner shroud radially disposed from the rotor at an inner radial end of the airfoil and an airfoil cooling circuit having inlet and outlet plenums running radially outward from the rotor within and through the airfoil, a plurality of cooling channels in flow communication with the inlet plenum and the outlet plenum, the plurality of cooling channels spaced within an outside wall of the airfoil and proximate the hot gas, the airfoil cooling circuit providing a flow path for coolant to flow from the inlet plenum, through the plurality of cooling channels and to the outlet plenum.

12. The gas turbine as described in claim 11, the cooling circuit further comprising flow turbulators in the cooling channels for imparting turbulence to the coolant flowing through the cooling channels.

13. The gas turbine as described in claim 11, wherein the coolant comprises one of steam or air.

14. The gas turbine as described in claim 11, wherein the inner and the outer shrouds each comprise an impingement hole, an exhaust hole, and a pedestal bank disposed therebetween, such that the flow path for the coolant runs through the impingement hole, through the pedestal bank and through the exhaust hole, respectively.

15. The gas turbine as described in claim 14, further comprising a manifold in each of the inner and outer shrouds and extending around at least a portion of a periphery of the respective radial end of the airfoil and in flow communication with the exhaust holes in the respective shroud and the outlet plenum, such that the flow path for the coolant further runs from the exhaust holes into the respective manifold and into the outlet plenum.

16. The gas turbine as described in claim 14, the inner and outer shrouds each further comprising a flow guide disposed between the impingement hole and the exhaust hole for directing coolant flow from the impingement hole to the exhaust hole.

17. A gas turbine comprising:
a compressor that compresses air;
a combustor enclosed within a shell and in flow communication with the compressor and producing a hot gas;
a turbine section in flow communication with the combustor, the turbine section having a rotor extending therethrough; and
a vane disposed within the turbine section and comprising an airfoil, an outer shroud radially disposed from the rotor at an outer radial end of the airfoil, and an inner shroud radially disposed from the rotor at an inner radial end of the airfoil;
an airfoil cooling circuit comprising inlet and outlet plenums running radially outward from the rotor within and through the airfoil, a plurality of cooling channels running from the inlet plenum and to the outlet plenum, the airfoil cooling circuit providing a flow path for coolant to flow from the inlet plenum, through the cooling channels and to the outlet plenum; and
a shroud cooling circuit disposed within each of the inner and outer shrouds, each shroud comprising an impingement hole, an exhaust hole and a pedestal bank arranged between the impingement hole and the exhaust hole, the shroud cooling circuit providing a flow path for coolant to flow from the impingement hole, through the pedestal bank and through the exhaust hole.

18. The gas turbine as described in claim 17, the airfoil cooling circuit further comprising flow turbulators in the cooling channels for imparting turbulence to the coolant flowing through the cooling channels.

19. The gas turbine as described in claim 17, wherein the coolant comprises one of steam or air.

20. The gas turbine as described in claim 17, further comprising slots in each radial end of the outlet plenum such that the flow path for the coolant further runs from the exhaust holes of the shroud cooling circuits through the slots in the respective end of the airfoil and to the outlet plenum.

21. A gas turbine comprising:

a compressor that compresses air;

a combustor enclosed within a shell and in flow communication with the compressor and producing a hot gas;

a turbine section in flow communication with the combustor, the turbine section having a rotor extending therethrough; and a vane disposed within the turbine section and comprising an airfoil, an outer shroud radially disposed from the rotor at an outer radial end of the airfoil, and an inner shroud radially disposed from the rotor at an inner radial end of the airfoil; and a shroud cooling circuit disposed within each of the inner and outer shrouds, each shroud comprising an impingement hole, an exhaust hole and a pedestal bank arranged between the impingement hole and the exhaust hole, the shroud cooling circuit providing a flow path for coolant to flow from the impingement hole, through the pedestal bank and through the exhaust hole.

22. The gas turbine as described in claim 21, further comprising an airfoil cooling circuit including inlet and outlet plenums running radially outward from the rotor within and through the airfoil, a plurality of cooling channels running from the inlet plenum and to the outlet plenum, the plurality of cooling channels spaced within an outside wall of the airfoil and proximate the hot gas, the airfoil cooling circuit providing a flow path for coolant to flow from the inlet plenum, through the cooling channels and to the outlet plenum.

23. The gas turbine as described in claim 22, further comprising slots in each radial end of the outlet plenum such that the flow path for the coolant further runs from the exhaust holes of the shroud cooling circuits through the slots and to the outlet plenum.

* * * * *